(12) United States Patent
Amundsen et al.

(10) Patent No.: US 12,014,165 B2
(45) Date of Patent: Jun. 18, 2024

(54) BOOTLOADER UPDATING

(71) Applicant: Nordic Semiconductor ASA, Trondheim (NO)

(72) Inventors: Håkon Øye Amundsen, Trondheim (NO); Frank Audun Kvamtrø, Trondheim (NO); Øyvind Rønningstad, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 191 days.

(21) Appl. No.: 17/764,904

(22) PCT Filed: Sep. 30, 2020

(86) PCT No.: PCT/EP2020/077399
§ 371 (c)(1),
(2) Date: Mar. 29, 2022

(87) PCT Pub. No.: WO2021/064039
PCT Pub. Date: Apr. 8, 2021

(65) Prior Publication Data
US 2022/0342657 A1    Oct. 27, 2022

(30) Foreign Application Priority Data

Sep. 30, 2019 (GB) .................................. 1914047

(51) Int. Cl.
*G06F 8/65* (2018.01)
*G06F 9/4401* (2018.01)
(52) U.S. Cl.
CPC .............. *G06F 8/65* (2013.01); *G06F 9/4401* (2013.01)
(58) Field of Classification Search
USPC ........................................................ 717/168
See application file for complete search history.

(56) References Cited

U.S. PATENT DOCUMENTS 7,055,150 B2 * 5/2006 Terada .............. G06K 15/1805
                                                      358/1.15
7,398,331 B2 * 7/2008 Aoyama ............. G06F 11/1433
                                                      710/10
(Continued)

FOREIGN PATENT DOCUMENTS

CN         110 134 426 A      8/2019
WO       WO 03/025742 A2      3/2003
(Continued)

OTHER PUBLICATIONS

International Search Report and Written Opinion for PCT/EP2020/077399, dated Dec. 14, 2020, 13 pages.
(Continued)

*Primary Examiner* — Qing Chen
*Assistant Examiner* — Clint Thatcher
(74) *Attorney, Agent, or Firm* — Klarquist Sparkman, LLP (57) ABSTRACT

A microcontroller comprises a processor and a memory. The memory comprises a first-stage bootloader, a first second-stage bootloader, a second second-stage bootloader region, and an application region for storing an application. The processor is configured to execute instructions from the first-stage bootloader when the microcontroller is reset. The first-stage bootloader comprises instructions for transferring execution from the first-stage bootloader to the active second-stage bootloader, which comprises instructions for transferring execution to an address in the application region, and for causing the processor to write a replacement second-stage bootloader to whichever of the first and second second-stage bootloader regions is not the active region. The first-stage bootloader comprises instructions for detecting the replacement second-stage bootloader in whichever of the first and second second-stage bootloader regions is not the active region and for transferring execution to the replace- (Continued)

ment second-stage bootloader when the microcontroller is next reset.

22 Claims, 3 Drawing Sheets

(56) References Cited

U.S. PATENT DOCUMENTS

| | | | | |
|---|---|---|---|---|
| 2005/0055595 | A1* | 3/2005 | Frazer | G06F 8/654 |
| | | | | 713/400 |
| 2013/0179871 | A1* | 7/2013 | Nagao | G06F 8/65 |
| | | | | 717/170 |
| 2016/0283220 | A1* | 9/2016 | Tverdal | H04W 4/50 |
| 2017/0017485 | A1* | 1/2017 | Ye | G06F 8/656 |
| 2017/0357515 | A1* | 12/2017 | Bower, III | G06F 9/4411 |
| 2018/0101388 | A1 | 4/2018 | Hummel et al. | |
| 2018/0267793 | A1* | 9/2018 | Watanabe | G06F 3/0659 |
| 2021/0191661 | A1* | 6/2021 | Harata | G06F 3/0604 |

FOREIGN PATENT DOCUMENTS

| | | |
|---|---|---|
| WO | WO 2015/016867 A1 | 2/2015 |
| WO | WO 2015/092355 A1 | 6/2015 |

OTHER PUBLICATIONS

IPO Combined Search and Examination Report under Sections 17 and 18(3) for GB1914047.4, dated Jan. 21, 2020, 7 pages.
"Secure bootloader chain," Nordic Semiconductor, downloaded from the internet: https://developer.nordicsemi.com/nRF_Connect_SDK/doc/0.3.0/br/ug_bootloader.html, Sep. 24, 2019, 2 pages.

* cited by examiner

BOOTLOADER UPDATING

CROSS REFERENCE TO RELATED APPLICATIONS

This is the U.S. National Stage of International Application No. PCT/EP2020/077399, filed Sep. 30, 2020, which was published in English under PCT Article 21(2), which in turn claims the benefit of Great Britain Application No. 1914047.4, filed Sep. 30, 2019.

BACKGROUND OF THE INVENTION

This invention relates to methods and apparatus for updating bootloaders on microcontrollers.

A microcontroller will often contain a bootloader in a dedicated memory region. This may be loaded separately from other software on the device. The bootloader contains software code that is executed first every time the microcontroller is booted or reset (e.g. when the microcontroller is first powered on, or reset after a fault occurs).

The bootloader may perform various start-up operations, such as checking the hardware, loading register values from memory, and initialising the microcontroller's processor and peripherals. It may also verify the security of the microcontroller—e.g. by establishing a root of trust (RoT) that can be used to detect any unauthorised changes to software installed in the microcontroller. Once it has completed its tasks, the bootloader transfers execution to other software on the microcontroller, such as to a stand-alone application or to a real-time operating system.

A bootloader is typically installed in a region of memory to which access is restricted (e.g. write-restricted), so that the bootloader itself cannot be accidentally or maliciously modified or overwritten.

Some bootloaders also provide functions for updating software on the microcontroller, e.g. after the device has been deployed. When the microcontroller includes a radio modem, the bootloader may, for example, include instructions for controlling the radio to receive an updated application software and for installing the application on the microcontroller.

WO 2015092355, by the present applicant, discloses a microcontroller containing a bootloader and firmware module, in addition to an application module. The bootloader or firmware can use radio communication logic to receive and store updated firmware and application modules. However, updating the firmware module requires that the application module be updated too before the device can be fully used again. This is inflexible and can result in a slow update process.

The present invention seeks to provide an improved approach to updating software on a microcontroller.

SUMMARY OF THE INVENTION

From a first aspect, the invention provides a microcontroller comprising a processor and a memory, wherein:
the memory comprises a first-stage bootloader region, a first second-stage bootloader region, a second second-stage bootloader region, and an application region for storing an application;
a first-stage bootloader is stored in the first-stage bootloader region;
an active second-stage bootloader is stored in an active one of the first and second second-stage bootloader regions;
the processor is configured to execute instructions from the first-stage bootloader when the microcontroller is reset;
the first-stage bootloader comprises instructions for transferring execution from the first-stage bootloader to the active second-stage bootloader;
the active second-stage bootloader comprises instructions for transferring execution from the active second-stage bootloader to an address in the application region;
the active second-stage bootloader comprises instructions for causing the processor to write a replacement second-stage bootloader to whichever of the first and second second-stage bootloader regions is not the active region; and
the first-stage bootloader comprises instructions for detecting the replacement second-stage bootloader and for transferring execution to the replacement second-stage bootloader when the microcontroller is next reset.

From a second aspect, the invention provides a method of updating a bootloader on a microcontroller, wherein:
the microcontroller comprises a processor and a memory;
the memory comprises a first-stage bootloader region, a first second-stage bootloader region, a second second-stage bootloader region, and an application region;
a first-stage bootloader is stored in the first-stage bootloader region;
an active second-stage bootloader is stored in an active one of the first and second second-stage bootloader regions;
an application is stored in the application region; and
the processor is configured to execute instructions from the first-stage bootloader when the microcontroller is reset,
the first-stage bootloader comprises instructions for transferring execution from the first-stage bootloader to the active second-stage bootloader;
the active second-stage bootloader comprises instructions for transferring execution from the active second-stage bootloader to the application;
the method comprising:
the active second-stage bootloader causing the processor to write a replacement second-stage bootloader to whichever of the first and second second-stage bootloader regions is not the active region, wherein the first-stage bootloader comprises instructions for detecting the replacement second-stage bootloader and for transferring execution to the replacement second-stage bootloader when the microcontroller is next reset.

Thus it will be seen that, in accordance with the invention, the bootloader is divided into two parts: a first-stage bootloader which executes first after the microcontroller is reset, and a second-stage bootloader, to which execution passes from the first-stage bootloader. The second-stage bootloader can be located in either of two possible memory regions. The provision of two possible locations for the second-stage bootloader enables the second-stage bootloader to be involved in its own updating. One or more software applications (e.g. a standalone user application or a real-time operating system) can be stored in a separate application region, which enables the second-stage bootloader to be updated without the processor having to overwrite any applications that may be stored in the application region.

This arrangement enables flexible and fine-grained updating of the software on the microcontroller.

The first-stage bootloader may be written during a manufacturing step—e.g. through an external debug interface. The first-stage bootloader may be immutable. This can help secure the microcontroller against accidental bugs or malicious attacks, by preventing the first-stage bootloader from being modified after it has been installed. This can, in turn, enable other software on the device from being modified without detection, e.g. by using the trusted first-stage bootloader to verify the integrity of other software stored in the memory.

The microcontroller may comprise hardware protection circuitry configured to prevent the first-stage bootloader from being overwritten by software stored in the memory. For example, a system protection unit may be configured to prevent writing to the first-stage bootloader region unless the first-stage bootloader region is in an erased state, or unless the whole memory is in an erased state. The microcontroller may comprise a system protection unit configured to intercept bus transactions and to block any write, or any unauthorised write, to the first-stage bootloader region. The memory may store no software instructions for updating the first-stage bootloader—e.g. no instructions for writing to the first-stage bootloader region.

The first-stage bootloader may comprise instructions for authenticating one or more software components stored in the memory. It may comprise a hash algorithm for calculating a hash value from data stored in a region of the memory. It may comprise a cryptographic signature verification algorithm for verifying a cryptographic signature of data stored in a region of the memory. It may comprise instructions for authenticating the second-stage bootloader. It may be configured to transfer execution to the second-stage bootloader only if an authentication process of the second-stage bootloader is successful.

In this way, the first-stage bootloader may be used to establish a chain of trust for the microcontroller.

The first-stage bootloader may comprise instructions for testing one or more hardware components. It may comprise instructions for initialising one or more registers or peripherals.

The memory may be non-volatile memory, such as flash. The microcontroller may also comprise volatile memory, such as RAM and/or one or more registers.

In some embodiments, the first-stage bootloader does not contain any instructions for writing to the second-stage bootloader regions or to the application region. It may contain no instructions for writing to the memory at all. Instead, the second-stage bootloader may comprise all the memory write instructions for causing the processor to write the replacement second-stage bootloader to the inactive second-stage region. This enables the first-stage bootloader to be kept compact, resulting in less chance of it containing bugs. It can also allow instructions from the first-stage bootloader, such as a cryptographic library, to be made accessible to other software (e.g. to the second-stage bootloader or an application) without risk of the shared code being used to write, accidentally or maliciously, to a sensitive region of the memory.

The active or replacement second-stage bootloader may comprise instructions for verifying or authenticating one or more software components stored in the memory, such as for verifying an application or set of applications stored in the application region. It may use one or more routines shared by the first-stage bootloader to achieve this, or it may contain separate hashing and/or cryptographic algorithms.

The microcontroller may comprise a communications interface, which may be a wireless interface. It may comprise a radio modem. It may be configured to receive the replacement second-stage bootloader over the communications interface. The second-stage bootloader may comprise instructions for controlling the communications interface to receive the replacement second-stage bootloader. However, in other embodiments, an application stored in the application region comprises instructions for controlling the communications interface to receive the replacement second-stage bootloader. This can enable the second-stage bootloader to be more compact.

In some such embodiments, the application may store the replacement second-stage bootloader (temporarily) in an update working region of the memory. This update working region may be a reserved memory region, which may be sized to accommodate the entire replacement second-stage bootloader. It may be a region of non-volatile memory.

The second-stage bootloader may comprise instructions for copying the replacement second-stage bootloader from the update working region to whichever of the first and second second-stage bootloader regions is not the active region. The application may comprise one or more instructions for causing the microcontroller to reset after receiving the replacement second-stage bootloader; this allows control to be transferred to the active second-stage bootloader to continue the update procedure.

In other embodiments, the application or second-stage bootloader may receive the replacement second-stage bootloader and write the replacement second-stage bootloader directly to whichever of the first and second second-stage bootloader regions is not the active region—i.e. without the replacement second-stage bootloader being stored in an update working region of the memory and then being copied to the inactive second-stage bootloader region.

The application may comprise a first portion and a second portion, the first portion being configured as secure (e.g. being arranged to be executed by the processor in a secure state) and the second portion being configured as non-secure (e.g. being arranged to be executed by the processor in a non-secure state). The first, secure portion of the application region may comprise instructions for configuring a system protection unit of the microcontroller; it may comprise a secure partition manager (SPM). The second, non-secure portion of the application region may comprise the majority of the application—e.g. all the rest of the logic of the application other than the SPM. Instructions in the second portion may use an application programming interface (API) provided by the first portion to instruct the first portion to write the replacement second-stage bootloader directly to whichever of the first and second second-stage bootloader regions is not the active region. This API may be made available to the second portion using an Arm™ TrustZone™ non-secure callable (NSC) region. This can provide a secure way to enable the application to write to the second-stage bootloader regions.

However, it may be beneficial to use an update working region as a temporary storage region, at least in some embodiments. In particular, the update working region may be configured to be writeable by the application (e.g. configured as non-secure), whereas the second-stage bootloader regions may be configured to be not writable (and/or readable) by the application (e.g. configured as secure). This can provide greater security for the second-stage bootloaders against overwriting by malicious or faulty application code. It may also facilitate a convenient memory architecture in which a first contiguous span of the memory address space, comprising all the bootloader regions, is configured as secure, while a second contiguous span of the memory address space, comprising all the temporary storage region and the application region, is configured as non-secure. These first and second continuous spans may, between them, cover the whole memory (e.g. all the flash in the microcontroller). This can enable simple hardware control of memory access, based on just one address comparison operation. Memory access control may be implemented using methods complying with Arm™ TrustZone™ specifications, or in any other suitable way.

In some embodiments, the microcontroller may comprise hardware protection circuitry configured to prevent the first and second second-stage bootloader regions from being written to by software executed from the application region (and/or from the update working region). Software in the application region and/or update working region may be executed by the processor in a non-secure state. However, the hardware protection circuitry may allow writing to the first and second second-stage bootloader regions by software stored in the first and second second-stage bootloader regions. Software in these regions may be executed by the processor in a secure state. In other embodiments, the hardware protection circuitry may be configurable to allow at least a secure portion of an application in the application region to write to the first and/or second second-stage bootloader regions.

The application may receive the replacement second-stage bootloader from the communications interface (e.g. radio modem) and write it to the non-volatile memory (or may instruct the communications interface to write it directly to the non-volatile memory) without the application writing the replacement second-stage bootloader first to volatile memory such as RAM. This can help limit the amount of volatile memory that the microcontroller needs to have.

The first-stage bootloader region, first second-stage bootloader region, second second-stage bootloader region, and application region (and update working region, where present) may be distinct, non-overlapping regions of the memory (e.g. flash memory). Each region may span a respective contiguous address space, although this is not essential and one or more of the regions may be divided into a plurality of disjoint sub-regions. The first and second second-stage bootloader regions may be of the same size. The first-stage bootloader region may be smaller than each of the first and second second-stage bootloader regions. The microcontroller may have less RAM than the size of any one of these region, or the size of either of the first and second second-stage bootloader regions.

The first-stage bootloader may detect the replacement second-stage bootloader in any appropriate way. In some embodiments, the active second-stage bootloader or an application in the application region may signal to the first-stage bootloader that the replacement second-stage bootloader has been written—e.g. by writing a flag to a predetermined memory address which the first-stage bootloader may read when the microcontroller is next reset (booted). In some embodiments, the first-stage bootloader may detect the presence of the replacement second-stage bootloader directly—e.g. by accessing metadata stored in, or associated with, each of the first and second second-stage bootloader regions. For example, each second-stage bootloader may comprise metadata representative of an age of the second-stage bootloader (which could be absolute, or relative to one or more other second-stage bootloader versions), such as a timestamp or a version number or other data from an ordered set of data, and the first-stage bootloader may comprise a comparison algorithm to determine which of the first and second second-stage bootloader regions contains a newer second-stage bootloader. It may transfer execution to the newer second-stage bootloader.

The active second-stage bootloader may comprise one or more instructions for causing the microcontroller to reset after writing the replacement second-stage bootloader to the inactive region.

The writing of the second-stage bootloader to the inactive region and/or the activation of the second-stage bootloader (which may comprise the detecting of the second-stage bootloader by the first-stage bootloader) may occur at a later time than the receiving of the replacement second-stage bootloader—e.g. minutes, hours or days later. The writing may occur at a prescheduled time. The activation may occur at a prescheduled time (which may be later than the writing). This can avoid interrupting operations at sensitive times. It may also enable the writing or activation to occur even when the microcontroller has no active communications link established—e.g. when it is out of radio reception range.

It will be appreciated that the second-stage bootloader may be updated not just once but repeatedly over time, using respective second-stage replacement bootloaders. The active region may toggle between the first and second second-stage bootloader regions with each update.

While the replacement second-stage bootloader may comprise position-independent code, in other embodiments the replacement second-stage bootloader may comprise position-dependent code—i.e. non-relocatable code, which must be located at a fixed memory address in order to function correctly. An operator may generate two versions of the replacement second-stage bootloader, one version for each second-stage bootloader region, and the application may be configured to signal (e.g. over a radio channel) which version to receive, depending on which of the first and second second-stage bootloader regions is the active region. The application may, for instance, select a URL from which to retrieve the updated second-stage bootloader from two different URLs, depending on which of the first and second second-stage bootloader regions is the active region.

Alternatively, the application or the active second-stage bootloader may comprise a relocating loader for modifying the received replacement second-stage bootloader for execution in whichever of the first and second second-stage bootloader regions is not the active region. However, such an approach is less preferred as it would make it harder to establish a chain of trust involving the replacement second-stage bootloader, since the microcontroller would have to be provided with a second cryptographic signature that matches the modified replacement second-stage bootloader, which may be difficult to generate.

In some embodiments, software stored in the application region may be updatable independently of the second-stage bootloader. The application region may store an active application. The second-stage bootloader or the active application may comprise instructions for receiving a replacement application image (which could include one or more applications and/or an operating system). The second-stage bootloader or the active application may comprise instructions for writing the replacement application image to the memory. In some embodiments, the second-stage bootloader may write the replacement application image to the application region—e.g. overwriting the active application. In other embodiments, the replacement application image may be written to another region of memory, which may be the aforementioned update working region. The second-stage bootloader may comprise instructions for determining which of the update working region and the application region contains a newer application image, and for transferring execution to the newer application image when the microcontroller is reset. The roles of the update working region and the application region may be switched after each update of the application image. This may avoid unnecessary memory erases and writes, and may enable more efficient use of the memory.

The processor may be an Arm™ Cortex™-M series processor, or any other processor.

Any of the first-bootloader, second-bootloader and application regions may be secure regions to which read and/or write and/or execute access is controlled by the microcontroller. The processor may be inherently security-aware. The microcontroller may support Arm™ TrustZone™. The microcontroller may comprise a bus system, configured to carry bus transactions; it may be configured to carry security-state signals for distinguishing between secure bus transactions and non-secure bus transactions. The microcontroller may comprise hardware filter logic (e.g. a system protection unit) configured to intercept bus transactions, and, for each intercepted bus transaction, to use an address of the intercepted bus transaction and a security state of the intercepted bus transaction to determine whether to allow the intercepted bus transaction, in accordance with a set of filtering rules. It may block intercepted bus transaction that are determined not to be allowed.

The microcontroller may comprise a radio modem, which may support a cellular radio protocol such as the 3GPP Long Term Evolution (LTE) Cat-M1 or Narrowband Internet-of-Things (NB-IoT) cellular radio protocols.

The microcontroller may comprise one or more peripheral components, which may include:
- interface peripherals, such as an SPI (Serial Peripheral Interface) peripheral, UART (Universal Asynchronous Receiver-Transmitter) peripheral, two-wire interface peripheral, I²C (Inter-Integrated Circuit) peripheral; and/or
- data-conversion peripherals, such as an ADC (Analogue-to-Digital Converter) peripheral, DAC (Digital-to-Analogue Converter) peripheral, PWM (Pulse Width Modulation) peripheral, quadrature decoder peripheral, or a cryptographic co-processor; and/or
- peripherals for controlling an operation of the device, such as a GPIO (General-Purpose Input-Output) control peripheral, for configuring one or more GPIO pins of the device, or a DPPI (Distributed Programmable Peripheral Interconnect) control peripheral, for configuring a peripheral interconnect system on the device.

The microcontroller may comprise any one or more of: further processors, digital logic, analogue circuitry, DSPs, power supplies, user interfaces, sensors, etc. It may be, or may comprise, an integrated-circuit system-on-chip (SoC) or radio-on-a-chip device.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
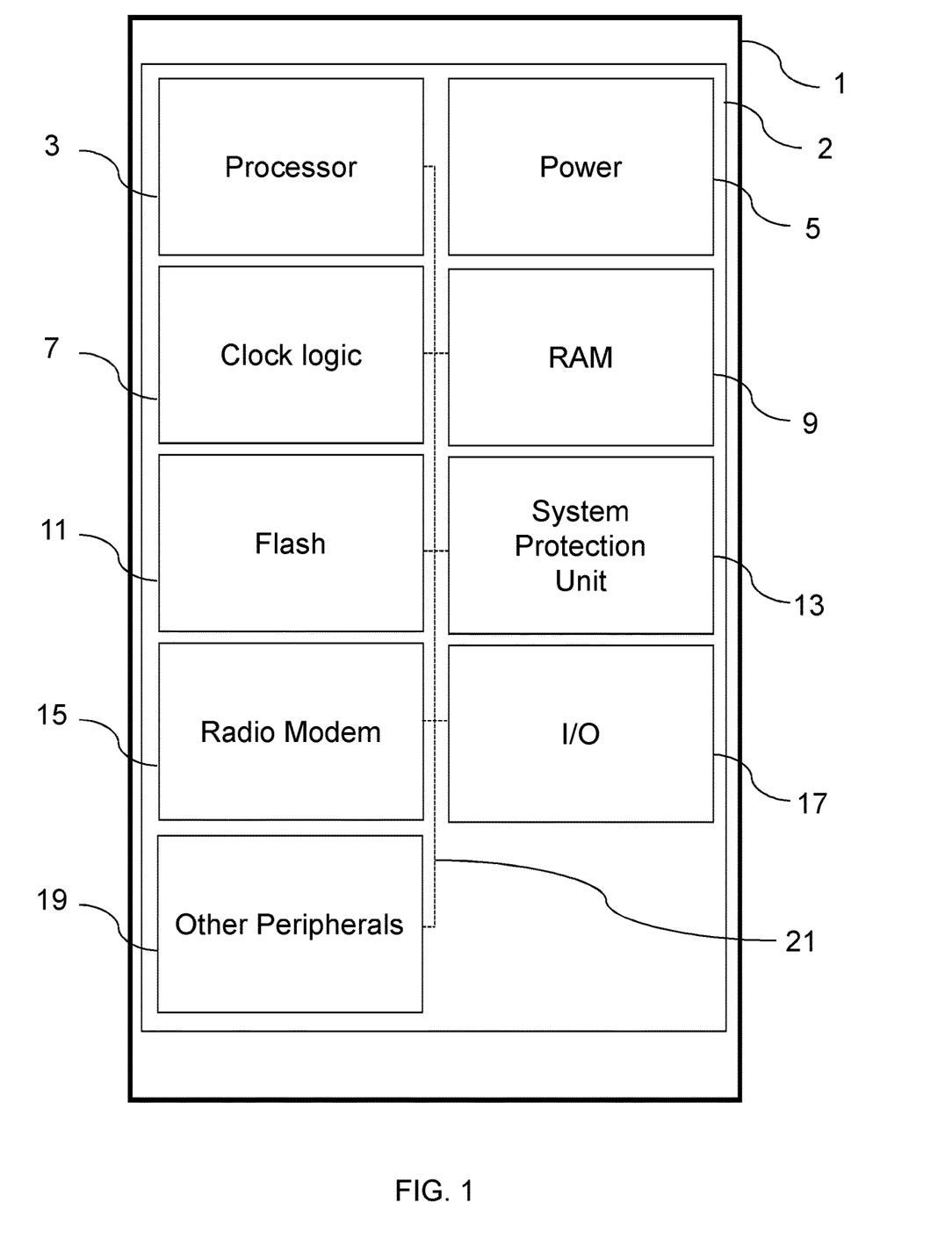
FIG. 1 is a schematic drawing of a microcontroller embodying the invention.

FIG. 1 schematically shows a device 1 that contains an integrated-circuit microcontroller 2 with on-board digital radio capabilities (i.e. a radio-on-a-chip device). The device 1 may be a wireless building temperature sensor, a wearable sensor, or other Internet-of-Things device The microcontroller 2 includes:
- a processor 3 (e.g. an Arm™ Cortex™-M33);
- power management circuitry 5;
- clock logic 7 (which may receive a periodic signal from an off-chip crystal oscillator);
- RAM 9;
- non-volatile flash memory 11;
- a system protection unit 13;
- a radio modem 15 (e.g. implementing 3GPP 4G Cat-M1 and Cat-NB1 standards);
- input/output circuitry 17 (e.g. supporting SPI, I2C, UART, GPIO pins, etc.);
- other peripherals 19 (e.g. timers, cryptographic accelerators, analogue-to-digital converters, etc.);
- a bus system 21 (e.g. implementing the Arm™ Advanced Microcontroller Bus Architecture (AMBA) standard).

The system protection unit 13 is arranged to intercept bus transactions and to control access between the processor 3, the memory 9, 11, and the peripherals 15, 17, 19—e.g. based on whether the respective devices and/or memory regions are in a secure or non-secure state. It may support Arm™ TrustZone™ access principles.

The radio modem 15 may include its own processor, separate from the application processor 3, and may have separate volatile and/or non-volatile memory for executing firmware for controlling the radio modem 15.

The device 1 may contain any number of other components, some of which may be connected to the microcontroller 2, such as a power supply, radio antenna, crystal oscillator, capacitors, sensors, audio/visual output devices, etc. These are not shown in FIG. 1 for reasons of clarity.

Figure 2:
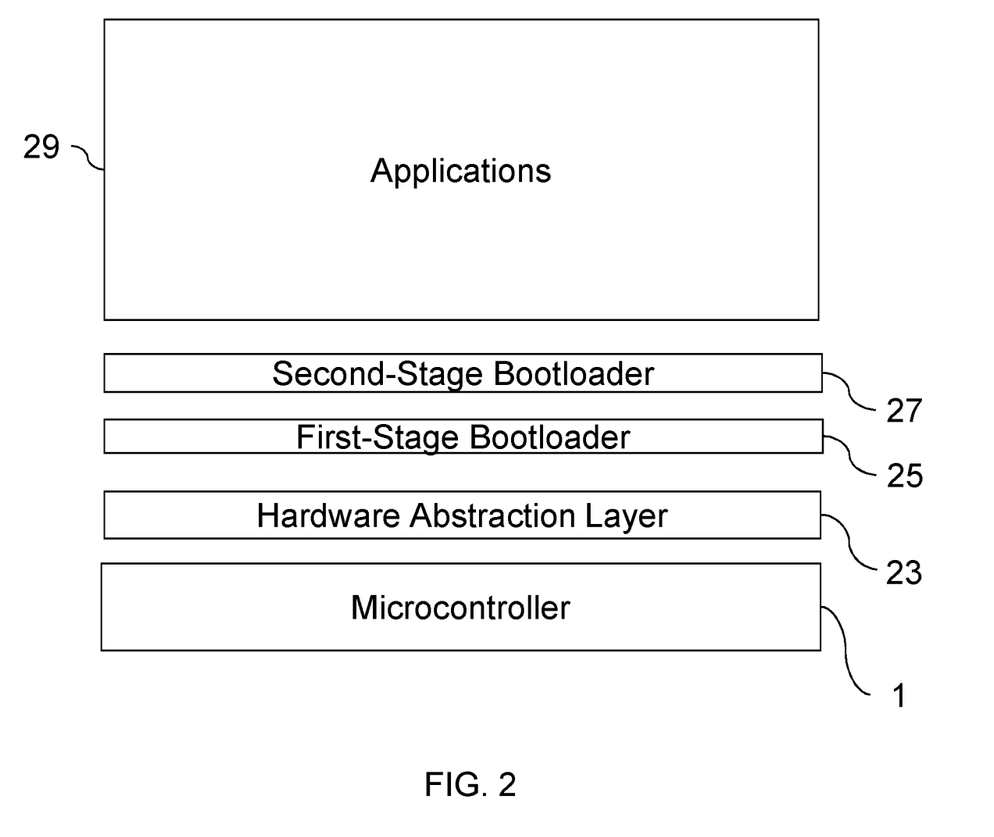
FIG. 2 is a schematic drawing showing major software components within the microcontroller architecture.

FIG. 2 shows the major components of the software architecture, which is stored in the flash memory 11 for execution by the processor 3. These include a hardware abstraction layer 23, an immutable first-stage bootloader 25, an upgradable second-stage bootloader 27, and one or more software applications 29. The hardware abstraction layer 23 may implement the ARM™ Cortex™ Microcontroller Software Interface Standard. The applications 29 can use libraries to access and use the radio modem 15, as well as other hardware features of the microcontroller 2. In some embodiments, the applications may include a real-time operating system (RTOS), although this is not essential.

The first-stage bootloader 25 and second-stage bootloader 27 are small binary applications, located in respective regions of the flash memory 11. The immutable first-stage bootloader 25 is the entry point after the microcontroller 2 is reset. Between them, the bootloaders 25, 27 initialise the microcontroller 2 and verify its integrity, before transferring execution to a primary application 29. They are also responsible for handling in-the-field software updates, as described below. The second-stage bootloader 27 may have access to the radio modem 15.

The bootloaders 25, 27 are responsible for verifying the integrity of any applications 29, and the bootloaders 25, 27 themselves. The bootloaders 25, 27 provide a chain of trust which ensures that all code that is executed is authorised. If, for example, an attacker attempts to modify an application 29, or if there is a bug in the code that overwrites parts of the application flash 29, the secure bootloader chain can detect that the flash 11 has been altered and can prevent the application 29 from starting up.

The immutability of the first-stage bootloader 25 enables a strong chain of trust to be established, since it guarantees the trustworthiness of the first link in the chain, which is the foundation upon which the rest of the chain in built.

A secure system depends on building and maintaining a chain of trust through all layers in the system. Each step in this chain will guarantee that the next step can be trusted to have certain properties, because any illegal modification of a following step will be detected and the process halted. The trustworthiness of each layer is guaranteed by the previous layer, all the way back to a property in the system referred to as a root of trust (RoT). The RoT relies on hardware, software, and data components that must always behave in an expected manner.

The secure bootloader chain in this embodiment consists of a sequence of images that are booted one after the other. To establish a root of trust, the first-stage bootloader image 25 verifies a cryptographic signature of the second-stage bootloader image 27. Then the second-stage bootloader image 27, in turn, verifies a cryptographic signature of the application or applications 29. If these verifications are successful, execution is passed to a principal application 29, but if any of them fail, the device 1 may reset or disabled, or other appropriate protective action taken.

Figure 3:
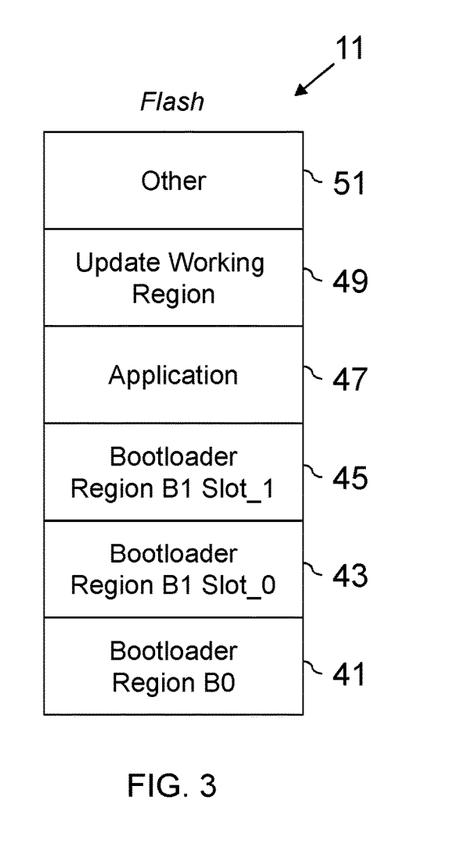
FIG. 3 is a schematic memory map for the microcontroller.

FIG. 3 shows part of the memory map of the flash memory 11.

It includes:
a first bootloader region B0 41;
a second bootloader region B1 which is divided into a first subregion or slot_0 43 and a second subregion or slot_1 45;
an application region 47;
an update working region 49; and
optionally other space 51.

The first-stage bootloader 25 is stored in the first bootloader region B0 41. This image is installed before the microcontroller 2 is deployed—e.g. during manufacture of the microcontroller 2 or during the assembly or commissioning of the device 1 (such as a wireless thermostat, etc.) into which the microcontroller 2 is fitted. The first-stage bootloader 25 is immutable—i.e. it is not typically expected to be updated once the device is deployed. In particular, the first-stage bootloader 25 cannot be updated or deleted from the microcontroller 2 unless the whole flash memory 11 is erased, which would not be done through a normal over-the-air update procedure.

By contrast, the second-stage bootloader 27 is upgradable in the field—i.e. after device deployment. This can allow new functionality to be implemented, or bugs to be fixed.

At any point in time, an active second-stage bootloader 27 is stored either in slot_0 43 or in slot_1 45 of the second bootloader region B1. The other slot 43, 45 may be empty or may contain an inactive version of the second-stage bootloader, which may differ from the active version.

The first-stage bootloader 25 runs after every reset and establishes the root of trust by verifying the signature and metadata of the next image in the boot sequence—i.e. of the active second-stage bootloader 27. If verification fails, the boot process stops.

In this way, the first-stage bootloader 25 can guarantee that if the flash of the active slot of the bootloader region B1 has been tampered with in any way, that image will not start up. So if an attacker attempts to take over the device by altering the flash 11, the device 1 will not boot and not run the infected code.

The first-stage bootloader 25 includes the following checks:
Signature verification: Uses an asynchronous signature verification algorithm and a hashing algorithm to verify that the key used for signing the second-stage bootloader 27 matches one of a set of known public keys; and
Metadata verification: Checks the second-stage bootloader 27 for appropriate metadata.

The set of public keys may be flashed to the microcontroller 2 during one of the manufacturing steps. They may be stored in such a manner that they can optionally be flashed at the same time as the first-stage bootloader 25, or at a later time, as required. For example, all the code of the microcontroller 2 may be flashed at one factory, and then the microcontroller 2 may be sent to a second factory which loads the cryptographic keys without having to change the already flashed code.

The metadata for the second-stage bootloader 27 may, for example, include the following information:
a magic value which contains hardware identifiers and provides validity of the metadata structure;
size of the second-stage bootloader 27;
version of the second-stage bootloader 27 (e.g. a monotonic version number); and
address of the vector table.

The second-stage bootloader 27 carries out similar signature and metadata verification as the first-stage bootloader 25 on the application or applications 29 image contained in the application region 47.

In addition, the second-stage bootloader 27 provides functionality for upgrading both itself and the following image in the boot sequence. In most cases, this will be the application 29.

If an unexpected reset occurs during a software update, the second-stage bootloader 27 is responsible for detecting the reset and resuming the update procedure—i.e. resuming copying the replacement second-stage bootloader 27 to the inactive second-stage bootloader region.

Figure 4:
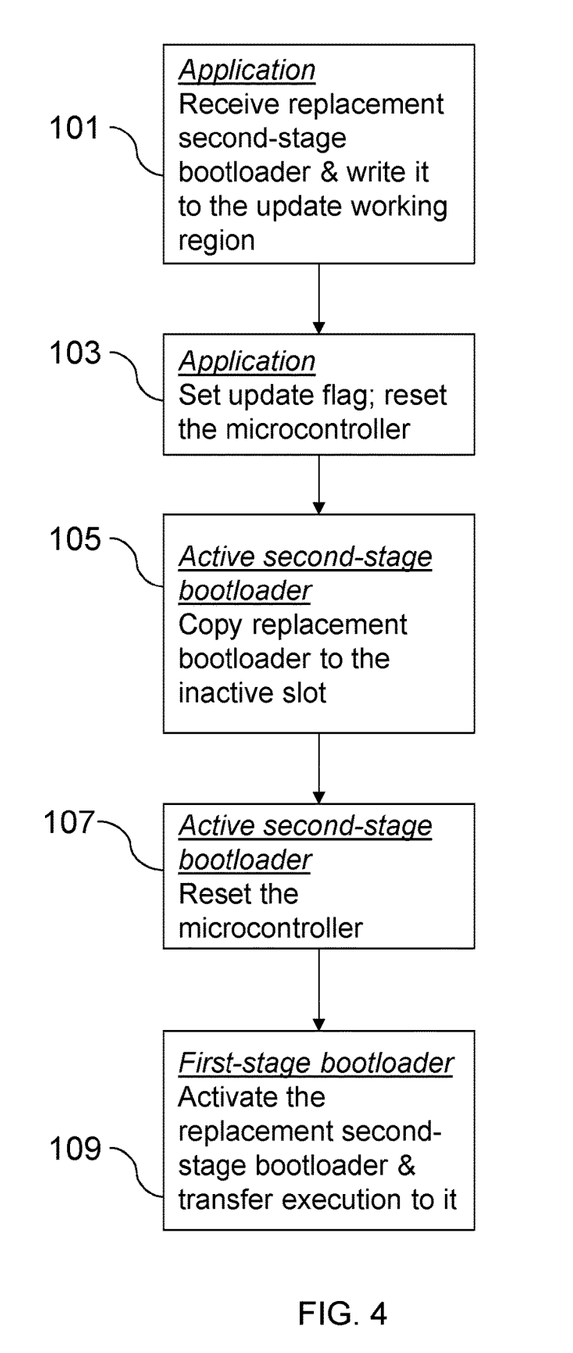
FIG. 4 is a flow chart showing key steps in a process of updating bootloader according to an embodiment of the invention.

The update process will now be described, with reference to the flow chart of FIG. 4.

In a first stage 101, the update process is initiated by the application 29, which controls the radio modem 15 to download a replacement second-stage bootloader 27 which it writes directly to the update working region 49, which is a reserved update bank of flash. The microcontroller 2 does not buffer the received bootloader 27 in RAM; this can reduce the RAM requirements of the microcontroller 2. This update working region 49 is at least as big as the largest updatable software component in the device—e.g. as large as the larger of the second-stage bootloader 27 and the application image 29.

Once the replacement second-stage bootloader 27 has been downloaded, and the application 29 determines that the update should take place (which may be scheduled some time after the downloading), in a second stage 103, the application 29 sets a flag, in a predetermined address in the update working region 49, to indicate that the update should proceed. It then resets the microcontroller 2.

Upon booting, in a third stage 105, the active second-stage bootloader 27 will copy the image of the replacement second-stage bootloader 27 from the update working region 49 to whichever of the Region B1 slots 0, 1 does not contain the active second-stage bootloader 27.

Once the update has been copied to the other second-stage bootloader slot 43, 45, in a fourth stage 107, the active second-stage bootloader 27 causes the microcontroller 2 to reset again.

Upon booting, in a fifth stage 109, the first-stage bootloader 25 detects that the inactive second-stage bootloader slot 43, 45 contains a newer version of the second-stage bootloader 27, and executes the replacement second-stage bootloader 27 from then on. The first-stage bootloader 25 detects this by reading the version data from the metadata of each of the second-stage bootloader regions and starting execution of whichever has the higher version number.

This approach ensures minimal network downtime for the device 1. No network operations are performed when copying the replacement image from the update working region 49 to the inactive second-stage bootloader slot 43, 45. However, by keeping the second-stage bootloader compact (e.g. 16 kB or less) this copy can be fast. For instance, it can be possible to perform a bootloader update in only 500 ms more time than is taken to perform a normal reset.

By having the application 29 be responsible for downloading the update, the second-stage bootloader need only handle image validation and flash copy routines during the update process. This enables the second-stage bootloader to be more compact, leading to fast bootloader updates and a lower risk of introducing bugs to the bootloader code. It can also enable a firmware update to happen in the background—i.e. with the application 29 maintaining its normal operation (e.g. as a temperature sensor) while also receiving the replacement firmware. This because the application 29 can schedule the download of the update in such a way that it does not interfere with the application's normal operation.

Because the previous second-stage bootloader 27 remains in the inactive slot 43, 45, in the unexpected event that the updated second-stage bootloader 27 fails to start the application 29, it is then possible for the first-stage bootloader 25 to roll back to use the old version of the second-stage bootloader 27.

After the second-stage bootloader 27 is updated, the application 29 remains intact and executable. The application 29 can be updated independently of the second-stage bootloader 27. By supporting independent updating of the bootloader 27 and the application(s) 29, undesirable downtime can be minimised, since it is not necessary to update the application image 29 whenever the bootloader 27 is updated.

This approach also enables the updated second-stage bootloader 27 to be activated (through a reset of the microcontroller 1) some while after the updated second-stage bootloader 27 has been downloaded to the device 1. The activating of the updated bootloader 27 can be decoupled in time from its downloading. Because the activation doesn't also require a new application image 29 to be downloaded at the same time, the activation does not require the device 1 to have any network connectivity. This can be useful as it can be desired by operators of networked devices 1 that they perform updates at specifics points in time, and yet the device 1 might typically lose network connectivity in an unpredictable manner.

In some embodiments, the first-stage bootloader 25 does not contain any flash-memory copy routines. This can enable code from the first-stage bootloader 25, such as a cryptographic library, to be safely shared any later stage in the boot chain. When code is shared like this, there can be a risk of having bugs in the interface between the components, allowing for arbitrary execution.

However, even if such a bug were to exist which made arbitrary execution of the code shared by the first-stage bootloader 25 possible, the lack of flash write capabilities means that any security risk is limited. In some embodiments, the only code contained in the first-stage bootloader flash area B0 41 that has execute permissions is for signature verification and hashing, which further limits any security concerns.

In a variant set of embodiments, the application 29' may write the downloaded replacement second-stage bootloader 27 directly to the inactive second-stage bootloader slot 43, 45, rather than writing it to a update working region 49. This can allow the second stage bootloader to be simpler and more efficient, as it does not need to contain instructions for validating and copying the replacement second-stage bootloader 27 from the update working region 49 to the inactive slot 43, 45. Some such embodiments may dispense with the update working region 49 altogether, thereby resulting in a lower memory usage.

In order to provide greater security in such variant embodiments, the variant application 29' may be divided into a secure part and a non-secure part. A first "Secure Partition Manager" (SPM) part of the application may be "secure", and enforce the configuration of the system protection unit 13. A second part of the application may be "non-secure" and contain the rest of the logic of the application. By leveraging a functionality called "non-secure-callable regions" provided by Arm™ TrustZone™, an application programming interface (API) can be exposed from the SPM part to the non-secure part of the application 29', allowing the non-secure part to perform "secure-only" operations, while being supervised by the SPM. One function provided to the non-secure part of the application 29' may be the capability to write to the inactive second stage bootloader slot 43, 45. The application 29' may use this function to write a downloaded replacement second-stage bootloader 27 directly to an inactive second-stage bootloader slot 43, 45.

In some embodiments, the second-stage bootloader 27 includes instructions for updating the application 29 in the application region 47. This is separate from the updating of the second-stage bootloader 27. The application 29 may download a replacement application image to the update working region 49. The second-stage bootloader 27 may then copy this to the application region 47. Alternatively, in some embodiments, the roles of the update working region 49 and the application region 47 may be swapped each time the application 29 is updated. In this way, the need to copy the application image from one flash area to another can be avoided.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A microcontroller comprising a processor and a memory, wherein:
the memory comprises a first-stage bootloader region, a first second-stage bootloader region, a second second-stage bootloader region, and an application region for storing an application;

a first-stage bootloader is stored in the first-stage bootloader region;
an active second-stage bootloader is stored in an active one of the first and second second-stage bootloader regions;
the processor is configured to execute instructions from the first-stage bootloader when the microcontroller is reset;
the first-stage bootloader comprises instructions for transferring execution from the first-stage bootloader to the active second-stage bootloader;
the active second-stage bootloader comprises instructions for transferring execution from the active second-stage bootloader to an address in the application region;
the active second-stage bootloader comprises instructions for causing the processor to write a replacement second-stage bootloader to whichever of the first and second second-stage bootloader regions is not the active region; and
the first-stage bootloader comprises instructions for detecting the replacement second-stage bootloader in whichever of the first and second second-stage bootloader regions is not the active region and for transferring execution to the replacement second-stage bootloader in whichever of the first and second second-stage bootloader regions is not the active region when the microcontroller is next reset, such that whichever of the first and second second-stage bootloader regions is not the active region becomes the active second-stage bootloader region when the microcontroller is next reset.

2. The microcontroller of claim 1, comprising hardware protection circuitry configured to prevent the first-stage bootloader from being overwritten by software stored in the memory.

3. The microcontroller of claim 1, wherein the memory stores no software instructions for updating the first-stage bootloader.

4. The microcontroller of claim 1, wherein the first-stage bootloader comprises instructions for authenticating the second-stage bootloader.

5. The microcontroller of claim 1, wherein the first-stage bootloader does not contain any instructions for causing the processor to write to any of the first second-stage bootloader region, the second second-stage bootloader region, and the application region.

6. The microcontroller of claim 1, wherein the active second-stage bootloader comprises instructions for authenticating an application stored in the application region.

7. The microcontroller of claim 6, wherein the active second-stage bootloader comprises instructions for using a cryptographic or hash routine contained in the first-stage bootloader to authenticating an application stored in the application region.

8. The microcontroller of claim 1, comprising a radio modem, wherein the microcontroller is configured to receive the replacement second-stage bootloader by radio.

9. The microcontroller of claim 1, wherein an application stored in the application region comprises instructions for controlling a communications interface of the microcontroller to receive the replacement second-stage bootloader.

10. The microcontroller of claim 9, wherein the memory is non-volatile memory and wherein the application comprises instructions for storing the replacement second-stage bootloader in an update working region of the memory; and
wherein the second-stage bootloader comprises instructions for copying the replacement second-stage bootloader from the update working region to whichever of the first and second second-stage bootloader regions is not the active region.

11. The microcontroller of claim 9, wherein the application comprises instructions for writing the replacement second-stage bootloader directly to whichever of the first and second-stage bootloader regions is not the active region.

12. The microcontroller of claim 1, wherein an application is stored in the application region, and wherein the application comprises a first and a second portion, the first portion being configured as secure and the second portion being configured as non-secure.

13. The microcontroller of claim 1, wherein the memory is a non-volatile memory, and wherein the first-stage bootloader region, the first second-stage bootloader region, the second second-stage bootloader region and the application region are distinct, non-overlapping regions of the memory.

14. The microcontroller of claim 1, wherein the first and second second-stage bootloader regions are of a common size, and wherein the microcontroller has an amount of random-access memory (RAM) that is less than said common size.

15. The microcontroller of claim 1, wherein the active second-stage bootloader or an application in the application region comprises instructions for signalling to the first-stage bootloader when the replacement second-stage bootloader has been written.

16. The microcontroller of claim 1, wherein the active second-stage bootloader comprises metadata representative of an age of the active second-stage bootloader, and wherein the first-stage bootloader comprises a comparison algorithm for determining which of the first and second second-stage bootloader regions contains a newer second-stage bootloader and for transferring executing the newer second-stage bootloader.

17. The microcontroller of claim 1, wherein the replacement second-stage bootloader comprises position-dependent code.

18. The microcontroller of claim 1, wherein the second-stage bootloader or an active application stored in the application region comprises instructions for receiving a replacement application image.

19. The microcontroller of claim 1, comprising hardware protection circuitry configured to prevent writing to the first and second second-stage bootloader regions by software executed from the application region.

20. A method of updating a bootloader on a microcontroller, wherein:
the microcontroller comprises a processor and a memory;
the memory comprises a first-stage bootloader region, a first second-stage bootloader region, a second second-stage bootloader region, and an application region;
a first-stage bootloader is stored in the first-stage bootloader region;
an active second-stage bootloader is stored in an active one of the first and second second-stage bootloader regions;
an application is stored in the application region; and
the processor is configured to execute instructions from the first-stage bootloader when the microcontroller is reset,
the first-stage bootloader comprises instructions for transferring execution from the first-stage bootloader to the active second-stage bootloader;
the active second-stage bootloader comprises instructions for transferring execution from the active second-stage bootloader to the application;

the method comprising:

the active second-stage bootloader causing the processor to write a replacement second-stage bootloader to whichever of the first and second second-stage bootloader regions is not the active region, wherein the first-stage bootloader comprises instructions for detecting the replacement second-stage bootloader in whichever of the first and second second-stage bootloader regions is not the active region and for transferring execution to the replacement second-stage bootloader in whichever of the first and second second-stage bootloader regions is not the active region when the microcontroller is next reset, such that whichever of the first and second second-stage bootloader regions is not the active region becomes the active second-stage bootloader region when the microcontroller is next reset.

21. The method of claim 20, wherein the first second-stage bootloader region is rewriteable, and wherein the second rewriteable second-stage bootloader region is rewriteable.

22. The microcontroller of claim 1, wherein the first second-stage bootloader region is rewriteable, and wherein the second rewriteable second-stage bootloader region is rewriteable.

* * * * *